US008181910B2

(12) United States Patent
Lewis

(10) Patent No.: US 8,181,910 B2
(45) Date of Patent: May 22, 2012

(54) METHOD, APPARATUS, AND SYSTEM FOR DEFLECTING AIR APPROACHING A WING

(76) Inventor: Blair J. Lewis, Katonah, NY (US)

( * ) Notice: Subject to any disclaimer, the term of this patent is extended or adjusted under 35 U.S.C. 154(b) by 873 days.

(21) Appl. No.: 12/262,568

(22) Filed: Oct. 31, 2008

(65) Prior Publication Data
US 2010/0108821 A1 May 6, 2010

(51) Int. Cl.
*B64C 23/00* (2006.01)
*B64C 21/00* (2006.01)
(52) U.S. Cl. .................. 244/130; 244/1 N; 244/205
(58) Field of Classification Search .............. 244/1 N, 244/130, 200, 204, 205
See application file for complete search history.

(56) References Cited

U.S. PATENT DOCUMENTS

| 5,797,563 | A | * | 8/1998 | Blackburn et al. | ............ 244/130 |
| 5,934,622 | A | * | 8/1999 | Meng | ............ 244/205 |
| 5,964,433 | A | * | 10/1999 | Nosenchuck | ............ 244/205 |
| 6,079,345 | A | * | 6/2000 | Tsunoda | ............ 114/67 R |
| 6,220,549 | B1 | * | 4/2001 | Tsunoda et al. | ............ 244/205 |
| 7,017,863 | B2 | | 3/2006 | Scott et al. | |
| 8,006,939 | B2 | * | 8/2011 | McClure et al. | ............ 244/205 |

FOREIGN PATENT DOCUMENTS
WO   WO 2008/016928 A1   2/2008

OTHER PUBLICATIONS

"NASA Facts", National Aeronautics and Space Administration, Glenn Research Center, Cleveland, Ohio 44135-3191, Nov. 2004, pp. 1-4.
Nelson, Robert C., et al., "Modification of the Flow Structure over a UAV Wing for Roll Control", University of Notre Dame and Orbital Research Inc., 45th Aerospace Sciences Meeting, Jan. 8-11, 2007, Reno, NV, pp. 1-15.
http://www.sciencedaily.com/releases/2008/06/080611135049.htm, ScienceDaily, Your source for the latest research news, "Professor Designs Plasma-propelled Flying Saucer", adapted from materials provided by the University of Florida, downloaded on Oct. 27, 2008, pp. 1-2.
http://www.time.com/time/magazine/article/0,9171,837819,00.html, Time in partnership with CNN, "Charged Aircraft", downloaded on Oct. 27, 2008, pp. 1-2.

* cited by examiner

*Primary Examiner* — Rob Swiatek
(74) *Attorney, Agent, or Firm* — Pearl Cohen Zedek Latzer, LLP

(57) ABSTRACT

Fluid having a velocity approaching a surface having a leading edge may be deflected. An electric field may be projected ahead of the leading edge of the surface to ionize at least some molecules of the fluid approaching the wing. The strength of the electric field may vary between a maximum level and a minimum level periodically over time. A magnetic field may be projected from the surface to deflect the ionized molecules of the fluid such that some or all of the deflection is normal to the velocity of the approaching fluid and normal to the leading edge of the surface while the electric field is below its maximum level.

21 Claims, 6 Drawing Sheets

US 8,181,910 B2

METHOD, APPARATUS, AND SYSTEM FOR DEFLECTING AIR APPROACHING A WING

FIELD OF THE INVENTION

The present invention relates to methods and systems for deflecting the flow of air molecules approaching a surface, thereby affecting the induced drag of the surface. In particular, the present invention relates to the influence of electromagnetic fields on the air flowing toward the leading edge of a wing.

BACKGROUND OF THE INVENTION

The effectiveness of a lifting body or surface such as for example a wing may be measured as a function of both the lift it provides as well as the drag induced. Both of these measures of performance are dependent on the wing profile, air speed, and other parameters of the environment and fluid toward and around the wing.

Active control of the flow of the fluid over a lifting body by introduction of electric fields has already been studied. In the late sixties Cahn and Andrew studied the use of an electric field to reduce the disruptive effects of a sonic boom and as a means for reducing drag (see "Charged Aircraft", Time magazine, Feb. 2, 1968). However, one concern with his approach was that the amount of power required for his electric field would not be economical, and no practical solution was offered. More recently, Nelson, Corke et al. studied the use of plasma actuators for roll control, published as "Modification of the Flow Structure over a UAV Wing for Roll Control", 45$^{th}$ Aerospace Sciences Meeting, Jan. 8-11, 2007, Reno, Nev.).

A method for the reduction of drag in the boundary layer for fluid flowing over surface has been proposed by Scott et al., see U.S. Pat. No. 7,017,863. This method involves a plasma generator constant pulsing electrodes mounted on the surface of a wing to disrupt the flow over the wing in the turbulent boundary layer of the flow. However, this method affects flow that has already passed the leading edge of the wing on a single surface at a time, e.g. two systems would be required for upper and lower surfaces of a wing. Furthermore, Scott's system is characterized by a high frequency continuous pulsing of his electrodes which may require considerable energy consumption.

DESCRIPTION OF THE DRAWINGS

Specific embodiments of the present invention will be described with reference to the following drawings, wherein.

SUMMARY

Figure 1:
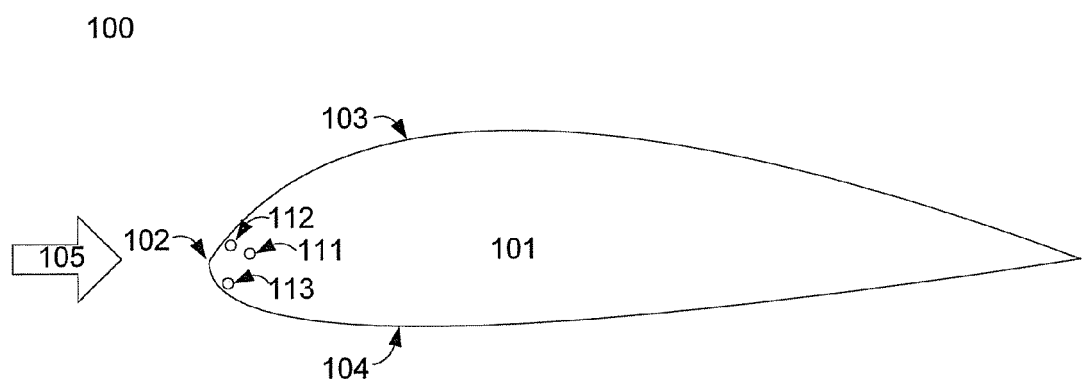
FIG. 1 is a simplified block diagram of a system for reducing drag on a wing shown in cross section accordance with an embodiment of the invention.

Embodiments of the present invention may include methods, apparatuses, and systems for deflecting fluid having a velocity approaching a surface having a leading edge. In one embodiment, an electric field may be projected ahead of the leading edge of the surface to ionize at least some molecules of the fluid approaching the wing. The strength of the electric field may vary between a maximum level and a minimum level periodically over time. A magnetic field may be projected from the surface to deflect the ionized molecules of the fluid such that some or all of the deflection is normal to the velocity of the approaching fluid and normal to the leading edge of the surface while the electric field is below its maximum level.

In another embodiment, an apparatus may include first and second electrodes both mounted on a surface having a leading edge. The first and second electrodes may be oriented with respect to each other and the leading edge so as to project an electric field ahead of the leading edge. The strength of the electric field may vary periodically between a maximum level and a minimum level. At its maximum strength, the electric field may ionize at least some molecule of a fluid having a velocity approaching the surface. The apparatus may also include an electromagnetic coil for projecting a magnetic field to deflect the ionized molecules such that some or all of the deflection is normal to the velocity of the approaching fluid and normal to the leading edge of the surface while the electric field strength is below its maximum level.

In another embodiment, a system may include first and second electrodes mounted on a surface parallel to a leading edge of the surface. The first and second electrodes may be oriented with respect to each other and the leading edge so as to project an electric field ahead of the leading edge. The strength of the electric field may vary periodically between a maximum level and a minimum level. At its maximum level, the electric field may ionize at least some molecules of a fluid having a velocity approaching the surface. The system may also include an electromagnetic coil for projecting a magnetic field to deflect the ionized molecules such that some or all of the deflection is normal to the velocity of the approaching fluid and normal to the leading edge of the surface while the electric field strength is below its maximum level. The system may also include a pulse generator connected to the first and second electrodes for supplying a time varying current to the first and second electrodes, and an environment measurement device connected to the pulse generator for measuring one or more indicators of the operating environment of the surface. The output of the pulse generator may be adjustable based on the measured one or more indicators of the surface operating environment.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Although the system and methods of the present invention are described with respect to operation in air as the medium, the present invention is not limited in this respect. Other fluid mediums for which the component particles or molecules may be ionized may also be used.

Furthermore, although the systems and methods of the present invention are described with respect to a wing as a surface having a leading edge, the present invention is not limited in this respect. Other surfaces over which fluids may flow may also be used. These surfaces may include, but are not limited to wingless rockets, missiles and other flying machines that may travel through gases (such as the atmosphere); ground vehicles such as automobiles, trucks, and trains; submarines, torpedoes and other machines that may travel through liquids. The shapes of some of these surfaces may not have a leading edge and may instead for example have a single point as the forward most point of the surface. For example, the fuselage of an airplane or a rocket may be cylindrical with a tipped conic surface as the forward most projecting part. Additionally, some embodiments of the invention may be applied to other parts of a surface, such as for example a trailing edge or main body of a surface.

Figure 2:
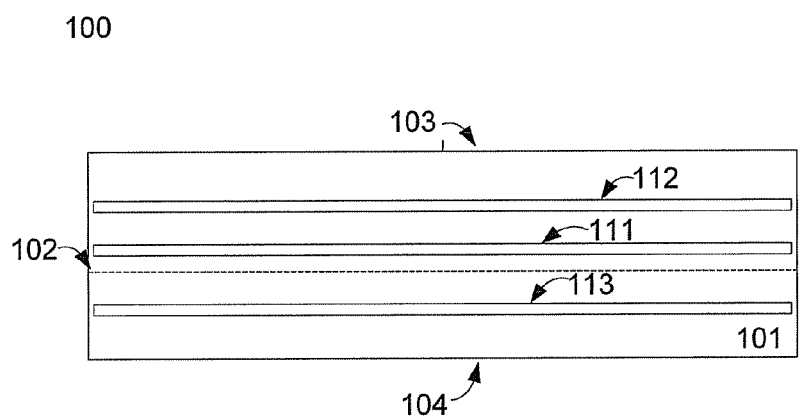
FIG. 2 is a simplified block diagram of a system for reducing drag on a wing shown in frontal view in accordance with an embodiment of the invention.

FIGS. 1 and 2 are simplified block diagrams of a system 100 for deflecting air approaching a wing in accordance with an embodiment of the invention system. System 100 may include a wing 101 shown in cross section in FIG. 1 and in frontal view in FIG. 2 having a leading edge 102, upper surface 103, and lower surface 104. The main flow of air approaching wing 101 is indicated by direction 105. Wing 101 may have incorporated therein an electromagnetic coil 111, a first electrode 112, and a second electrode 113.

Wing 101 may be for example any wing type used on an aircraft flown today and/or may be optimized to operate in accordance with the presently invented drag reduction system. Such optimization may include, but is not limited, the shape of the wing's cross section, the shape of the leading and trailing edges, the wing's length, and other wing design characteristics as known. As such, wing 101 may be a wing such as those flying for example on commercial jetliners built by the Boeing Corporation or may be as used in a single flying wing aircraft such as for example the B-2 Spirit bomber built by the Northrop Grumman Corporation. Other wing types may also be used.

In some embodiments, some portion or all of leading edge 102, upper surface 103, and/or lower surface 104 may be covered by or may incorporate a dielectric, e.g. an electrically insulating material in its structure. Incorporating or coating some or all of these surfaces with a dielectric material may prevent an undesired flow of ionized particles into and around wing 101, thereby avoiding any static discharges resulting from a charge buildup in or on wing 101 or one of its component surfaces.

Electromagnetic coil 111 may be any coiled electromagnet as known, other electromagnet, or permanent magnet capable of generating a magnetic field, to extend for example beyond leading edge 102 of wing 101 so as to affect the path of an ionized fluid molecule or particle traveling toward leading edge 102. In some embodiments, the magnetic field may be parallel to leading edge 102, although the invention is not limited in this respect: other orientations with respect to leading edge 102 are also possible. Furthermore, electromagnetic coil may also be mounted so as to affect the path of an ionized fluid molecule or particle travelling over another surface of wing 101, such as for example over upper surface 103 of wing 101.

If the magnetic field is parallel to leading edge 102, electromagnetic coil 111 may be aligned such that its central axis is parallel to leading edge 102 and located in close proximity to leading edge 102, although other alignments and orientations for electromagnetic coil 111 are possible. In some embodiments, electromagnetic coil 111 may be offset toward either upper surface 103 or lower surface 104. The net effect of this offset may be to deflect ionized air molecules approaching leading edge 102 in a direction either above upper surface 103 or below lower surface 104. Other offsets and orientations relative to leading edge 102, upper surface 103, and lower surface 104 may also be used.

Electrodes 112 and 113 may, in a preferred embodiment, be a pair of electrical conductors each oriented parallel to leading edge 102 of wing 101. In some embodiments electrode 112 may be offset toward upper surface 103, and electrode 113 may be offset toward lower surface 104, although the invention is not limited in this respect. Other orientations and positions of electrodes 112 and 113 relative to leading edge 102, upper surface 103, and lower surface 104 may also be used.

When air having a velocity relative to wing 101 is flowing toward wing 101 from direction 105, electrodes 112 and 113 in combination may generate an electric field ahead of leading edge 102 to ionize some or all of the approaching air molecules as a result of an induced dielectric breakdown of the approaching air. In embodiments for which the surface has no leading edge, the electric field may be projected to the exterior of the surface so as to ionize the molecules of the air approaching or moving over the surface.

Without any change in the electric field, the newly ionized air molecules may be repelled or deflected away from wing 101 in an undesired direction by the electric field such as for example opposite the velocity of the air. Reducing the strength of the electric field for example to zero may enable the ionized air molecules to approach wing 101 more closely. As the air molecules continuing moving toward wing 101, a magnetic field parallel to leading edge 102 that is generated by electromagnetic coil 111 may deflect the ionized air molecules in a direction normal to the velocity of the approaching air and normal to leading edge 102. In particular, some or all of the deflection may be above upper surface 103 or below lower surface 104 according to the relative geometry of wing 101, leading edge 102, the location of electromagnetic coil 111 and the direction from which the air may be approaching wing 101. In some embodiments with different configurations of electromagnetic coil 111 and electrodes 112 and 113, such as for example those surfaces not having a leading edge, the deflection of the air molecules may be normal to the velocity of the approaching or moving air and normal to the magnetic field. The resultant deflection may require less energy from the magnetic field than may be required if the deflection is induced by an electric field. Reducing the strength of the electric field to a lower level to for example a field strength of 0 V/m² or between a maximum level and 0 V/m² may allow a field generated by electromagnetic coil 111 to deflect the ionized air molecules with a much lower energy cost and without a direct negative impact on airspeed as compared to an electric field used for ionizing oncoming air molecules. Furthermore, the repulsive force of the electric field may have a component that is opposite of direction 105, e.g. it may act to reduce the airspeed of wing 101.

In some embodiments, the strength of the electric field may be varied periodically, e.g. increased and decreased regularly at fixed frequency between a maximum level that causes the ionization of air molecules and a minimum level such as 0 V/m² or some other level below the maximum level. This periodic variation may enable deflection of the ionized air molecules by the magnetic field at a much lower energy cost than for electric fields alone.

Figure 3:
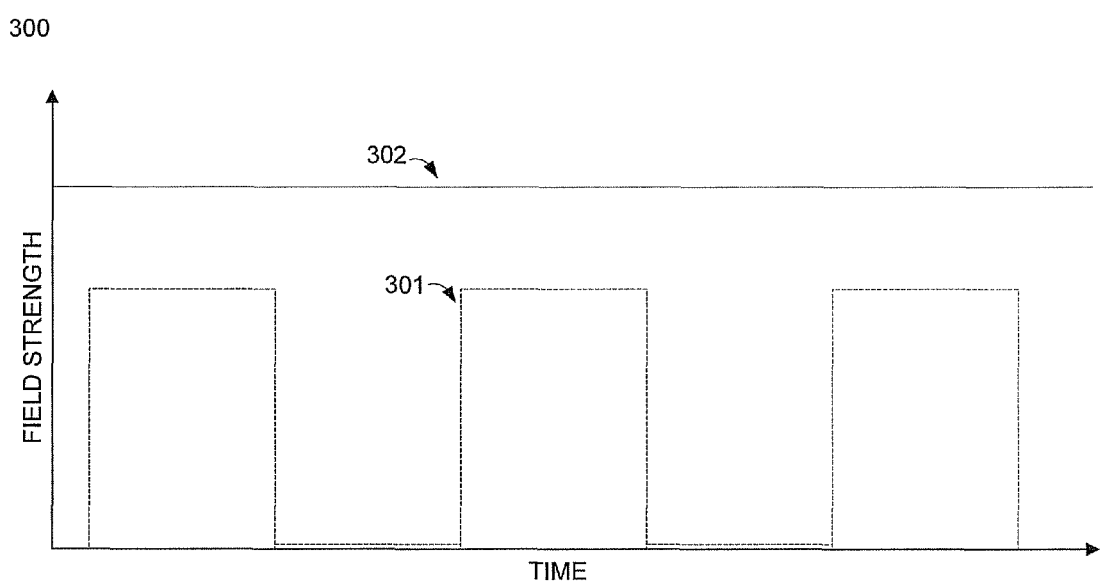
FIG. 3 shows a time variation of an electric field and a magnetic field in accordance with an embodiment of the invention.

Reference is now made to FIG. 3 which shows a time variation of an electric field and a magnetic field in accordance with an embodiment of the invention. Waveform 301 may be the time variation of the strength of an electric field and waveform 302 may be the time variation of the strength of a magnetic field. In the embodiment of FIG. 3, while the magnetic field strength may remain at a constant or near constant value, the electric field strength may vary as a square wave between 0 V/m² and a maximum value, although the invention is not limited in this respect. Other waveforms for the time variation of the electric field such as for example, a sawtooth, sinusoidal, impulse, may also be used. Furthermore, other parameters of the waveform such as frequency and phasing may also be varied. In some embodiments, the strength of the magnetic field may also vary with time.

In some embodiments, the maximum and minimum strengths and/or frequency of the variations of the electric field may be determined by one or more environmental measures for the operation of wing 101 including but not limited to the airspeed, altitude, air pressure, and other indicators as known.

Figure 4:
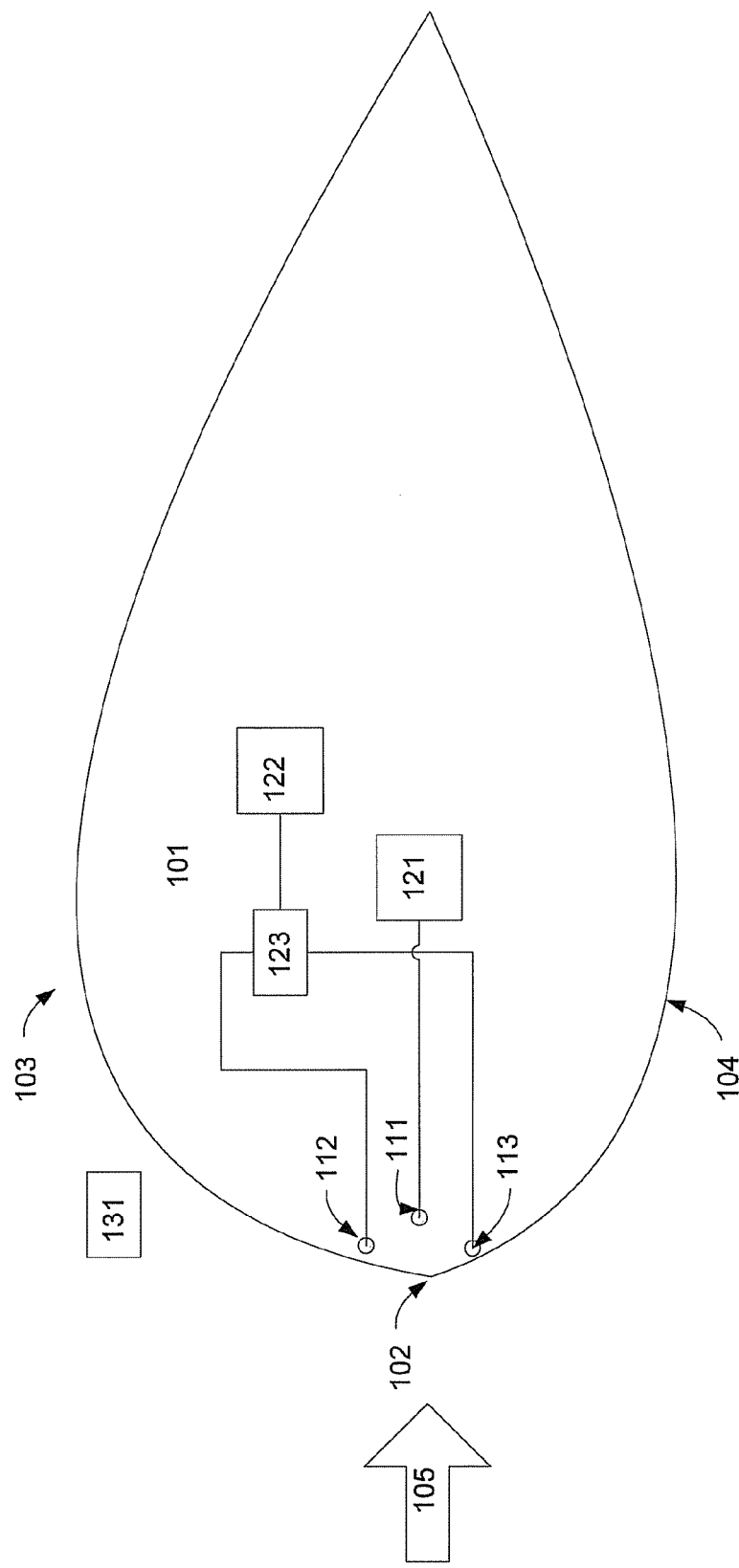
FIG. 4 is a simplified block diagram of a system for reducing drag on a wing in accordance with a second embodiment of the invention.

Reference is now made to FIG. 4 which is a simplified block diagram of a system for reducing drag on a wing in accordance with a second embodiment of the invention. In the embodiment of FIG. 4, those elements having the same numbers as in FIGS. 1 and 2 may have the same functionality as the elements of FIGS. 1 and 2. FIG. 4 shows an embodiment of the present invention with additional elements that may be implemented to supply power to electromagnetic coil 111 and electrodes 112 and 113 such as first power supply 121, second power supply 122, pulse generator 123, and environmental measurement system 131.

First power supply 121 may be connected to electromagnetic coil 111 as known and may be or include any source of direct current to activate electromagnetic coil 111. In some embodiments, first power supply 121 may derive its power from another source such as for example the propulsion system of an aircraft utilizing the present invention, although the invention is not limited in this respect. Alternatively, first power supply 121 may be or include a power storage system such as for example a battery or fuel cell. Other power sources are also possible.

The current level supplied by first power supply 121 may be determined by the magnetic field strength required to deflect ionized air molecules away from wing 101. As discussed herein, this field strength may vary with the operating environment of wing 101. Consequently, in some embodiments, the current output of first power supply 121 may be adjustable to match the operating environment of wing 101.

Second power supply 122 may be connected to pulse generator 123 which may be connected to electrodes 112 and 113 as known. Second power supply 122 may be a direct current source. Alternatively, in some embodiments power supply 122 may be an alternating current source. Pulse generator 123 may be a pulse generator as known capable of receiving a current input and producing a periodic time varying current output. The combination of second power supply 122 and pulse generator 123 may provide electrodes 112 and 113 with a time varying or pulsed current source as needed to generate an electric field to ionize at least some of the approaching air molecules. In some embodiments, pulse generator 123 may be or include a capacitor, direct current to alternating current converter, e.g. an inverter, and a signal generator, although the invention is not limited in this respect. Other components capable of generating a period time varying current may also be used. In some embodiments second power supply 122 and pulse generator 123 may be combined into a single unit. Furthermore, as with power supply 121, power supply 122 may derive its power from another source such as for example the propulsion system of an aircraft utilizing the present invention.

To accommodate different operating conditions, the output of pulse generator 123 and or first power supply 121 may be adjustable based on measurements taken by environmental measurement system 131. Environmental measurement system (EMS) 131 may be a device or system of devices capable of measuring indicators of the operating environment of wing 101. In some embodiments, EMS 131 may be located on wing 101; alternatively some or all of EMS 131 may be located elsewhere on an aircraft that incorporates wing 101. EMS 131 may include various devices as known in the art for measuring for example airspeed, altitude, air pressure, temperature, and the like. Such devices include for example pitot-static systems, radar altimeters, global positioning systems, etc. Other devices and systems may also be used.

Based on measurements taken by EMS 131, operating parameters for first power supply 121, second power supply 122, and pulse generator 123 may be computed. These operating parameters may be configured to set the strength and time variation of the electric field produced by electrodes 112 and 113 as well as the magnetic field produced by electromagnetic coil 111 to match currently measured operating condition. For example, the frequency of the period variations of the electric field may be increased to match an increase in an airspeed of wing 101. These adjustments may include for example varying the current level from second power supply 122 and varying the frequency of the output of pulse generator 123. As a second example, the resultant frequency and magnitude of the electric field may be adjusted to match a change in altitude, and therefore atmospheric density, at a constant speed. Other measurements and corresponding adjustments to operating parameters are also possible.

Figure 5:
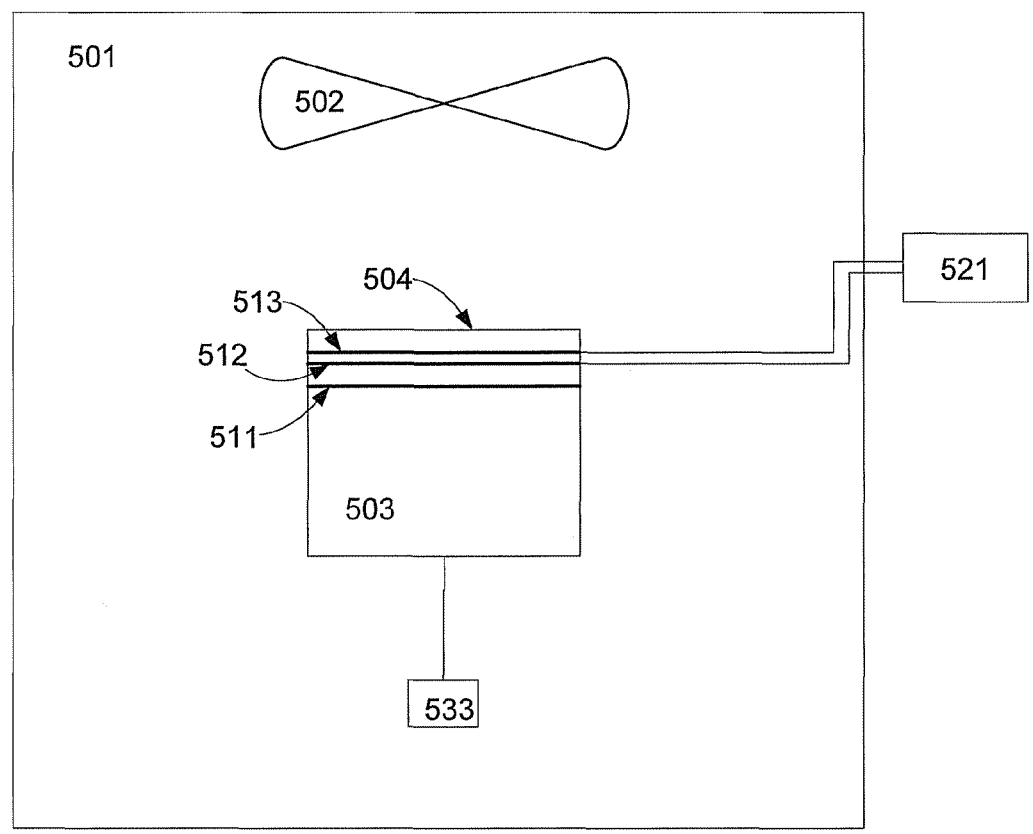
FIG. 5 is a simplified block diagram of a laboratory demonstration of an embodiment of the invention.
Figure 5:
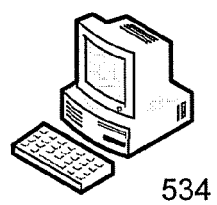

Reference is now made to FIG. 5 which is a simplified block diagram of a laboratory demonstration 500 of an embodiment of the invention. The embodiment of FIG. 5 may include an enclosure 501, a fan 502, a wing 503 incorporating therein an solid magnet 511 and first and second electrodes 512 and 513, AC spark generator 521, force probe 533, and computer 534.

In the embodiment of FIG. 5, an enclosure 501 may be set up with a fan 502 simulating airflow approaching a wing 503. Wing 503 may be a wing similar to wing 501 of FIGS. 1 and 2, having a leading edge 504 closest to fan 502 and configured for operation of the present invention. Wing 503 may have incorporated therein an solid magnet 511, and first and second electrodes 512 and 513 connected to an AC spark generator 521. Solid magnet 511 may be any solid magnet sized appropriately to replace an electromagnetic coil as discussed herein. Because the magnetic field of solid magnet 511 is continuously present, the power supply normally required for an electromagnetic coil is not required for the embodiment of FIG. 5.

AC spark generator 521 may for example operate at a frequency of 60 Hz producing an output voltage with a maximum amplitude of 5000 volts.

In some embodiments, wing 503 may be coated by an insulating material, e.g. a dielectric, to prevent any charge buildup on wing 503 from the ionized air molecules which would reduce or possibly eliminate the effect induced by the present invention.

Attached to wing 503 is a force probe 533 for measuring the net force on wing 503. In the embodiment of FIG. 5 the force probe is mounted behind the wing so as to measure the force on the wing parallel to the incoming airflow generated by fan 502. To record its measurements, force probe 533 may be connected to computer 534 which may be any personal computer or computer or computing platform capable of receiving signals from force probe 533, storing those signals, and displaying them for view, although the invention is not limited in this respect. For example, the measurements of force probe 533 may be collected and processed on a personal computer running Logger Pro software from Vernier Software and Technology. Other systems for measuring and recording the forces on wing 503 may also be used.

In the embodiment of FIG. 5, solid magnet 511 and electrodes 512 and 513 may operate similar to electromagnetic coil 111 and electrodes 112 and 113 respectively, e.g. in accordance with the present invention. Thus, when an alternating current from AC spark generator 521 is applied to electrodes 512 and 513, an electric field ahead of leading edge 504 may be produced. This electric field may ionize air molecules directed toward wing 503 by fan 502. As these ionized air molecules become close to wing 503, the magnetic field generated by solid magnet 511 may deflect the ionized air molecules away from wing 503 in a direction perpendicular to the magnetic field and the velocity of the ionized air molecules.

Figure 6:
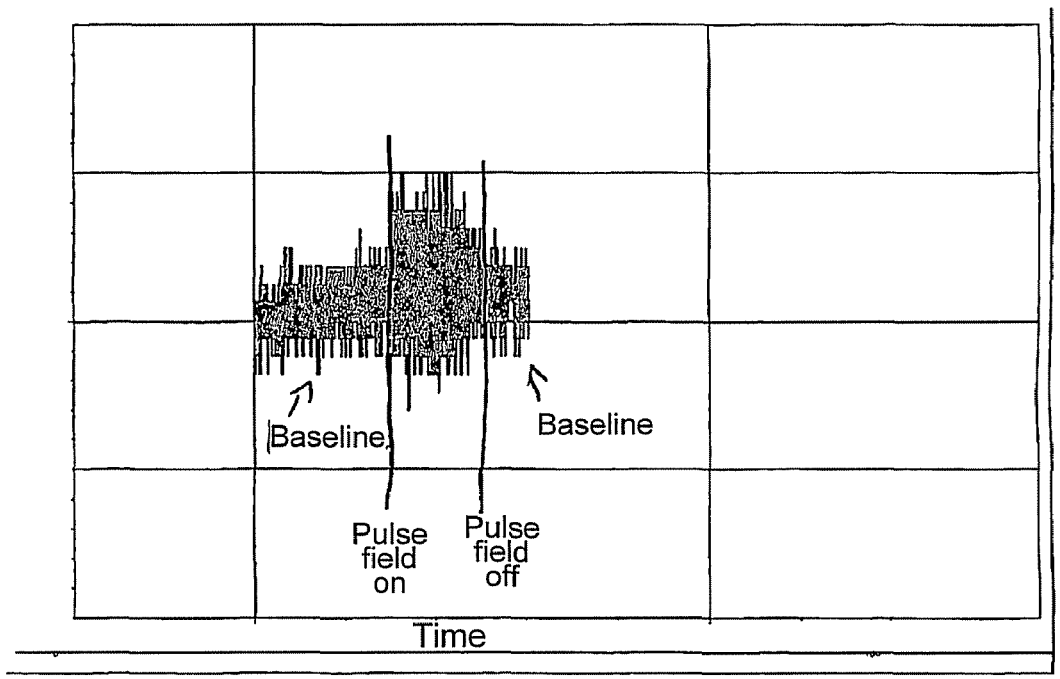
FIG. 6 shows the measured level of force on a wing for an embodiment of the invention.
Figure 7:
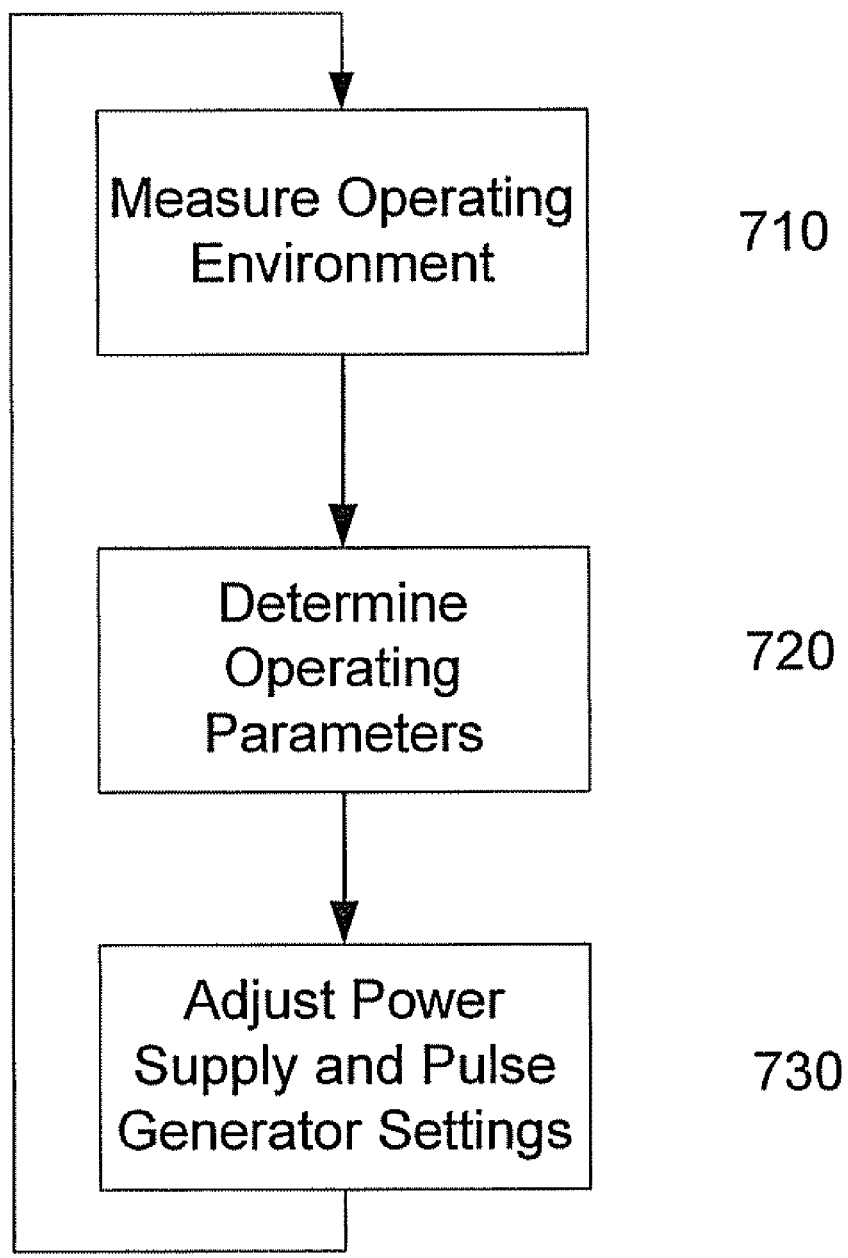
FIG. 7 is a flowchart showing a method for reducing drag in accordance with an embodiment of the invention.

FIG. 6 shows the measured level of force on wing 503 as measured by force probe 533 on the vertical scale in FIG. 6 over time (on the horizontal scale). Initially, spark generator 521 may be switched off while fan 502 is operational, although the magnetic field from solid magnet 511 may still be present in the setup. A baseline force level may be recorded as indicated in FIG. 6. Once current is supplied to electrodes 512 and 513, e.g. spark generator 521 is switched on, the measured force may change as can be seen in FIG. 6. The change is evident as an increase in the amplitude of the oscillations of the measured force and bias shift of those oscillations. Although not shown, operating the setup with spark generator 521 switched on and solid magnet 511 removed yielded a comparable increase in the amplitude of the oscillations without the bias shift evident in FIG. 6. Furthermore, operating the setup with spark generator 521 switched on and fan 502 switched off yielded no bias shift. Therefore, the bias shift of the measured force visible in FIG. 6 may be evidence of an increase in the deflection of ionized air molecules away from wing 503 caused by the operation of solid magnet 511 and electrodes 512 and 513 in accordance with the present invention. After spark generator 521 is switched off, the measured force may return to the baseline level Reference is now made to FIG. 7 which is a flowchart showing a method for deflecting air approaching a wing in accordance with an embodiment of the invention. This method may be implemented for example by system 100 of FIGS. 1, 2 and 4.

In operation 710, indicators the operating environment of a wing such as wing 101 may be measured using a device such as for example EMS 131. These measurements may include and are not limited to airspeed, altitude, temperature, and air pressure. From these measurements, a set of operating parameters for first power supply 121, second power supply 122, and pulse generator 123 may be computed (operation 720). Operating first power supply 121, second power supply 122, and pulse generator 123 at these computed operating parameters may ionize incoming air molecules and deflect them away from wing 101, thereby reducing induced drag on wing 101. Once the operating parameters have been computed, the settings for first power supply 121, second power supply 122, and pulse generator 123 may be adjusted accordingly in operation 730.

In some embodiments, operations 710-730 may be repeated at regular intervals to assure that a desired deflection of air or a desired reduction in drag is achieved. Alternatively, operation 710 may be repeated regularly and operations 720-730 may be repeated if a change in one or more of the measured parameters exceeds one or more pre-determined thresholds respectively.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

What is claimed is:

1. A method for deflecting fluid having a velocity approaching a surface having a leading edge, comprising:
projecting an electric field ahead of the leading edge of the surface, the electric field to ionize at least some molecules of the fluid approaching the surface, the strength of the electric field varying between a maximum level and a minimum level periodically over time; projecting a magnetic field from the surface, the magnetic field to deflect the ionized molecules of the fluid such that some or all of the deflection is normal to the velocity of the approaching fluid and normal to the leading edge of the surface while the electric field strength is below its maximum level; measuring one or more indicators of an operating environment of the surface; and adjusting the maximum level of the electric field strength according to the measured one or more indicators of the operating environment of the surface.

2. The method of claim 1, comprising adjusting a frequency of the electric field strength variations according to the measured one or more indicators of the operating environment of the surface.

3. The method of claim 1, comprising adjusting the magnetic field strength according to the measured one or more indicators of the operating environment of the surface.

4. The method of claim 1, wherein the magnetic field is offset from the electric field in a direction normal to the leading edge of the surface.

5. The method of claim 1, wherein the surface is a wing.

6. The method of claim 1, wherein the magnetic field is projected ahead of the leading edge of the surface.

7. The method of claim 1, wherein the magnetic field is projected parallel to the leading edge of the surface.

8. An apparatus comprising:
first and second electrodes both mounted on a surface, the first and second electrodes oriented with respect to each other so as to project an electric field exterior to the surface, wherein the strength of the electric field periodically varies between a maximum level and a minimum level, wherein the electric field at the maximum strength is to ionize at least some molecules of a fluid having a velocity approaching the surface; an electromagnetic coil for projecting a magnetic field to deflect the ionized molecules such that some or all of the deflection is normal to the velocity of the approaching fluid and normal to the magnetic field while the electric field strength is below its maximum level; and a pulse generator connected to the first and second electrodes for supplying a time varying current to the first and second electrodes, wherein a maximum current level of the output of the pulse generator is adjustable, the maximum current level corresponding to the maximum level of the electric field strength.

9. The apparatus of claim 8, wherein the surface is a wing having a leading edge, the electrodes project an electric field ahead of the leading edge, and the electromagnetic coil projects the magnetic field such that the some or all of the deflection is normal to the velocity of the approaching fluid and normal to the leading edge of the surface.

10. The apparatus of claim 9, wherein the first and second electrodes are parallel to a leading edge of the surface.

11. The apparatus of claim 9, wherein the electromagnetic coil is mounted parallel to the leading edge of the surface.

12. The apparatus of claim 9, wherein the electromagnetic coil is for projecting a magnetic field parallel to the leading edge and ahead of the surface.

13. An system comprising:
first and second electrodes both mounted on a surface parallel to a leading edge of the surface, the first and second electrodes oriented with respect to each other and the leading edge so as to project an electric field ahead of the leading edge, wherein the strength of the electric field periodically varies between a maximum level and a minimum level, wherein the electric field at the maximum strength is to ionize at least some molecules of a fluid having a velocity approaching the surface;
an electromagnetic coil for projecting a magnetic field to deflect the ionized molecules such that some or all of the deflection is normal to the velocity of the approaching fluid and normal to the leading edge of the surface while the electric field strength is below its maximum level;
a pulse generator connected to the first and second electrodes for supplying a time varying current to the first and second electrodes; and
an environment measurement device connected to the pulse generator for measuring one or more indicators of the operating environment of the surface;
wherein the output of the pulse generator is adjustable based on the measured one or more indicators of the surface operating environment.

14. The system of claim 13, wherein a frequency of the output of the pulse generator is adjustable.

15. The system of claim 13, wherein a maximum current level of the output of the pulse generator is adjustable, the maximum current level corresponding to the maximum level of the electric field strength.

16. The system of claim 13, wherein the environment measurement device measures the one or more indicators periodically.

17. The system of claim 13, wherein the output of the pulse generator is adjusted if a change in one or more of the measured indicators is above a threshold.

18. The system of claim 13, wherein the surface is a wing.

19. The system of claim 13, wherein the first and second electrodes are parallel to a leading edge of the surface.

20. The system of claim 13, wherein the electromagnetic coil is mounted parallel to the leading edge of the surface.

21. The system of claim 13, wherein the electromagnetic coil is for projecting a magnetic field parallel to the leading edge and ahead of the surface.

* * * * *